US011014536B2

United States Patent
Krishnan et al.

(10) Patent No.: US 11,014,536 B2
(45) Date of Patent: May 25, 2021

(54) VEHICLE CONTROLLER DELIVERY MODE

(71) Applicant: Ford Global Technologies, LLC, Dearborn, MI (US)

(72) Inventors: Venkatesh Krishnan, Canton, MI (US); Ravikumar Ranganathan, Farmington Hills, MI (US); Brandon Buckhalt, Belleville, MI (US); Vikas Bhatt, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 14/684,895

(22) Filed: Apr. 13, 2015

(65) Prior Publication Data
US 2016/0297400 A1 Oct. 13, 2016

(51) Int. Cl.
*B60R 25/30* (2013.01)
*B60R 25/102* (2013.01)
*B60R 25/24* (2013.01)

(52) U.S. Cl.
CPC .......... *B60R 25/241* (2013.01); *B60R 25/102* (2013.01); *B60R 25/305* (2013.01)

(58) Field of Classification Search
CPC ........ B60R 2325/103; B60R 2325/105; B60R 2325/205; B60R 2325/308; B60R 2325/40
USPC ................. 701/36; 296/146.1, 155; 180/173; 307/10.1, 10.2; 340/506, 541, 5.61, 5.62, 340/5.64, 5.25, 4.26, 426.14; 379/40
See application file for complete search history.

(56) References Cited

U.S. PATENT DOCUMENTS

| | | | |
|---|---|---|---|
| 4,881,148 A | * 11/1989 | Lambropoulos | ... G07C 9/00182 123/198 B |
| 5,005,664 A | 4/1991 | Hoffmann | |
| 5,319,364 A | 6/1994 | Waraksa et al. | |
| 5,682,314 A | * 10/1997 | Nishino | ................. B60T 8/172 700/79 |

(Continued)

FOREIGN PATENT DOCUMENTS

CN        200983194 Y       11/2007

OTHER PUBLICATIONS

The Key Knob; A. Ferscha; C. Holzmann; S. Resmerita; 26th IEEE International Conference on Distributed Computing Systems Workshops (ICDCSW'06); Year: 2006; pp. 62-62, DOI: 10.1109/ICDCSW. 2006.106.*

(Continued)

*Primary Examiner* — Cuong H Nguyen
(74) *Attorney, Agent, or Firm* — Michael J. Spenner; Brooks Kushman P.C.

(57) ABSTRACT

A vehicle may detect vehicle actions, compare the vehicle actions to first vehicle actions associated with first mode settings of a vehicle controller and to second vehicle actions associated with second mode settings of a vehicle controller, and transition the mode settings of the vehicle controller to the first mode settings responsive to the vehicle actions matching the first vehicle actions. The controller may be a vehicle body controller, and the mode settings may describe a locking behavior of the body controller. A mobile device may set vehicle actions configured to cause the controller to transition from the first mode settings to the second mode settings. The mobile device may also display an alert responsive to the controller detecting presence of an unauthorized user within vicinity of the vehicle.

17 Claims, 6 Drawing Sheets

(56) References Cited

U.S. PATENT DOCUMENTS

| | | | | |
|---|---|---|---|---|
| 5,708,417 A * | 1/1998 | Tallman | ............ | G01S 1/70 340/425.5 |
| 5,969,596 A | 10/1999 | Wu | | |
| 6,005,306 A * | 12/1999 | Pickard | ............ | E05B 47/0047 307/117 |
| 6,028,537 A * | 2/2000 | Suman | ............ | B60K 35/00 340/988 |
| 6,786,404 B1 * | 9/2004 | Bonner | ............ | B07C 3/00 235/385 |
| 7,915,998 B2 * | 3/2011 | Matsubara | ............ | G07C 9/00309 340/5.1 |
| 8,044,782 B2 * | 10/2011 | Saban | ............ | B60N 2/002 340/438 |
| 8,149,087 B2 * | 4/2012 | Brillon | ............ | E05B 49/00 340/5.61 |
| 8,169,104 B2 | 5/2012 | Cunningham et al. | | |
| 8,217,755 B2 * | 7/2012 | Martin | ............ | E05F 15/79 340/5.72 |
| 8,319,605 B2 * | 11/2012 | Hassan | ............ | G01C 17/38 340/10.2 |
| 8,405,515 B2 * | 3/2013 | Ishihara | ............ | B60R 25/246 340/10.1 |
| 9,104,537 B1 * | 8/2015 | Penilla | ............ | G06F 17/00 |
| 9,189,900 B1 * | 11/2015 | Penilla | ............ | G07C 9/00007 |
| 2001/0054952 A1 * | 12/2001 | Desai | ............ | E05B 77/48 340/5.72 |
| 2003/0085798 A1 * | 5/2003 | Castro Esteban | ... | G07C 9/00111 340/5.62 |
| 2004/0124968 A1 * | 7/2004 | Inada | ............ | B60R 25/2081 340/5.72 |
| 2004/0207511 A1 * | 10/2004 | McEwan | ............ | G07C 9/00309 340/5.61 |
| 2005/0100174 A1 * | 5/2005 | Howard | ............ | B60R 11/0217 381/86 |
| 2005/0146418 A1 * | 7/2005 | Caren | ............ | B60R 25/24 340/5.21 |
| 2007/0162191 A1 * | 7/2007 | Matsubara | ............ | G07C 9/00309 701/1 |
| 2007/0176737 A1 * | 8/2007 | Friese | ............ | B60R 25/2027 340/5.61 |
| 2007/0205877 A1 * | 9/2007 | Caren | ............ | B60R 25/24 340/426.14 |
| 2008/0129446 A1 | 6/2008 | Vader | | |
| 2008/0143477 A1 * | 6/2008 | Eichin | ............ | B60R 25/246 340/5.61 |
| 2009/0096606 A1 * | 4/2009 | Janov | ............ | G07C 9/00182 340/540 |
| 2009/0109008 A1 | 4/2009 | Kuo et al. | | |
| 2009/0193825 A1 * | 8/2009 | Hara | ............ | B60H 1/00642 62/132 |
| 2010/0302022 A1 * | 12/2010 | Saban | ............ | B60N 2/002 340/459 |
| 2010/0305779 A1 * | 12/2010 | Hassan | ............ | G01C 17/38 701/2 |
| 2013/0197776 A1 | 8/2013 | Davidson et al. | | |
| 2013/0271273 A1 * | 10/2013 | Oesterling | ............ | G07C 9/00309 340/426.18 |
| 2013/0278631 A1 * | 10/2013 | Border | ............ | G02B 27/017 345/633 |
| 2013/0325521 A1 * | 12/2013 | Jameel | ............ | G06Q 10/02 705/5 |
| 2014/0240088 A1 * | 8/2014 | Robinette | ............ | G08B 13/1427 340/5.61 |
| 2014/0274226 A1 * | 9/2014 | Pandya | ............ | G06F 1/3212 455/574 |
| 2015/0052253 A1 * | 2/2015 | Johnson | ............ | H04L 61/1511 709/226 |
| 2016/0098871 A1 * | 4/2016 | Oz | ............ | G07C 9/00111 340/5.61 |
| 2016/0264097 A1 * | 9/2016 | Oesterling | ............ | B60R 25/20 |

OTHER PUBLICATIONS

AES Security Protocol Implementation for Automobile Remote Keyless System; X. Ni; W. Shi; V. F. S. Fook; 2007 IEEE 65th Vehicular Technology Conference—VTC2007—Spring; Year: 2007; pp. 2526-2529, DOI: 10.1109/VETECS.2007.520.*

* cited by examiner

VEHICLE CONTROLLER DELIVERY MODE

TECHNICAL FIELD

Aspects of the disclosure generally relate to vehicles having multiple mode settings to configure operation of a vehicle controller, such as settings for a delivery mode and settings for a non-delivery mode.

BACKGROUND

Cargo vans may be used by package, flower, or other delivery services due to their carrying capacity and ease of loading and unloading. However, cargo vans may suffer from theft issues when the driver is delivering mail or other parcels, or when the driver is at an office and the van is unattended. As another possibility, the vehicle itself may be stolen while the user is making a delivery. Many of these thefts go unpunished and, in many cases, may not be covered by insurance. In many cases, the driver has no proof that a theft has been committed.

SUMMARY

In a first illustrative embodiment, a system includes a controller of a vehicle; first mode settings defining lock operation of the controller when the vehicle is performing delivery; and second mode settings defining lock operation of the controller otherwise, wherein the controller is configured to switch to the first mode settings from the second mode settings responsive to vehicle actions received by the controller indicative of the vehicle being operated to perform delivery.

In a second illustrative embodiment, a computer-implemented method includes detecting vehicle actions including operator proximity and vehicle door lock status; comparing the vehicle actions, as detected, to first vehicle actions associated with first mode settings of a vehicle body controller and to second vehicle actions associated with second mode settings of a vehicle body controller; and transitioning the mode settings of the vehicle body controller to the first mode settings responsive to the vehicle actions matching the first vehicle actions.

In a third illustrative embodiment, a system includes a mobile device configured to set vehicle actions to cause a controller of a vehicle to transition from first mode settings describing a first locking behavior of the controller to second mode settings of the controller describing a second locking behavior of the controller; and display an alert user interface responsive to the controller detecting presence of an unauthorized user within vicinity of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A system may be configured to provide a driver or other operator with knowledge of vehicle surroundings when the driver is away from the vehicle for a delivery. The system may also record video surroundings of the vehicle if an unauthorized entry is attempted, and communicate to the driver/operator that an unauthorized entry is being attempted. The system may also communicate with a remote server to enable evidence gathering or a central team to call for help if the vehicle user is unable to do so. The system may be further configured to automatically activate and deactivate the delivery mode based on detected actions performed in relation to the vehicle. Further aspects of the system are described in detail with respect to the Figures below.

Figure 1:
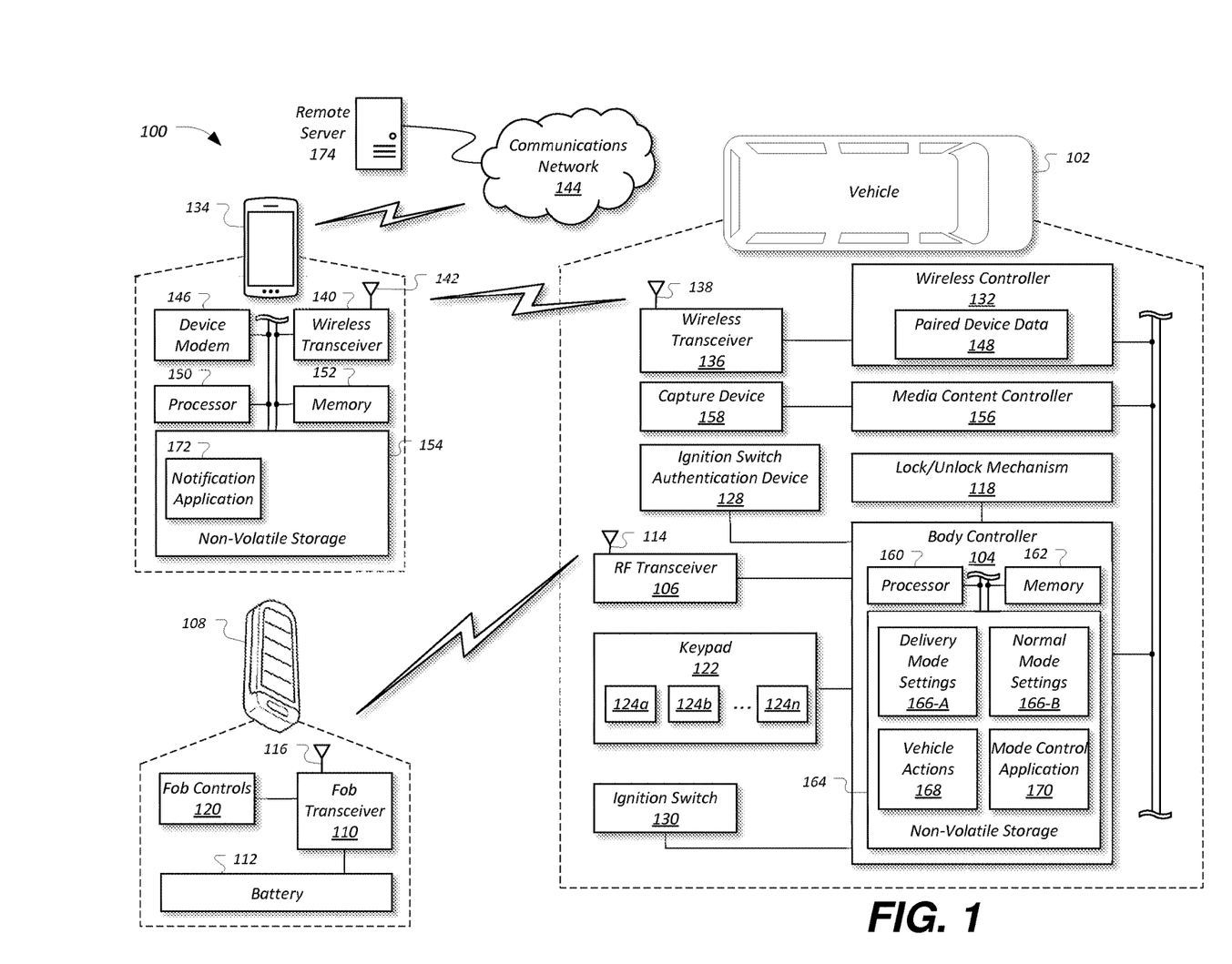
FIG. 1 illustrates an example passive entry system for a vehicle including delivery mode settings and normal mode settings.

FIG. 1 illustrates an example passive entry system 100 for a vehicle 102 including delivery mode settings 166-A and normal mode settings 166-B. The vehicle 102 may be one of various types of passenger vehicles, such as a full size van (e.g., a delivery van), crossover utility vehicle (CUV), a sport utility vehicle (SUV), a truck, a recreational vehicle (RV), or other mobile machine for transporting people or goods. The passive entry system 100 may support identification of authorized users through various techniques, such as key fob 108 proximity, keypad 122 code entry, mobile device 134 proximity, and media content captured by vehicle capture devices 158. The passive entry system 100 may be further configured to identify a vehicle actions 168 performed by the vehicle 102 responsive to user input. Based on the identification of the vehicle actions 168, the system 100 may determine which mode settings 166 to apply to the controller 104 to control vehicle access. In an example, based on the vehicle actions 168, the controller 104 may determine whether to use the delivery mode settings 166-A or the normal mode settings 166-B to specify operation of the passive entry system 100. It should be noted that the illustrated system 100 is merely an example, and more, fewer, and/or differently located elements may be used.

The body controller 104 may be configured to manage various power control functions, such as exterior lighting, interior lighting, and point of access status verification. The point of access status verification may include, as some possibilities, identification of open or closed status of the hood, doors and/or trunk of the vehicle 102. In an example, the body controller 104 may include or be connected to a radio frequency (RF) transceiver 106. A key fob 108 may be in communication with the RF transceiver 106 of the controller 104 utilizing a fob transceiver 110 powered by a battery 112. An antenna 114 of the RF transceiver 106 may receive RF signals from an antenna 116 of the fob transceiver 110, and may deliver the signals to the RF transceiver 106. An unlock/lock mechanism 118 may be operably coupled to the controller 104. The controller 104 may be configured to control the unlock/lock mechanism 118 to unlock/lock doors of the vehicle 102 in response to the RF signals transmitted by the key fob 108. The key fob 108 may include one or more fob controls 120, such as a lock switch and an unlock switch. Accordingly, the controller 104 controls the unlock/lock mechanism 118 to lock the doors of the vehicle 102 in response to a user depressing a lock fob control 120 of the key fob 108, and to unlock the doors of the vehicle 102 in response to the user depressing an unlock fob control 120 of the key fob 108.

The key fob 108 of the passive entry system 100 may be implemented in connection with a base remote entry system, a passive entry passive start (PEPS) system or a passive anti-theft system (PATS). With the PEPS system, the controller 104 may control the unlock/lock mechanism 118 to unlock the door in response to the controller 104 determining that the key fob 108 is a predetermined distance away from the vehicle 102. In such a case, the key fob 108 automatically (or passively) transmits encrypted RF signals (e.g., without user intervention) in order for the controller 104 to decrypt (or decode) the RF signals and to determine if the key fob 108 is within the predetermined distance and are authorized. It is to be noted that with the PEPS implementation, the key fob 108 also generate RF signals which correspond to encoded lock/unlock signals in response to a user depressing a lock fob control 120 or an unlock fob control 120. In addition, with the PEPS system, a key may not be needed to start the vehicle 102. The user in this case may be required to depress the brake pedal switch or perform some predetermined operation prior to depressing a start switch after the user has entered into the vehicle 102. In the PATS implementation, the key fob 108 may operate as a conventional key fob in order to unlock/lock the vehicle 102. With the PATS implementation, a keys (not shown) is generally needed to start the vehicle 102. The key may include a RF transmitter embedded therein to authenticate the key to the vehicle 102.

The system 100 may also include a keypad 122 in communication with the controller 104. The keypad 122 may be positioned on an exterior portion or section of the vehicle 102. In one example, the keypad 122 may be hardwired to the controller 104. In another example, the keypad 122 may be in RF communication with the controller 104 (e.g., via the RF antenna 114). The keypad 122 may include a plurality of mechanical pads, capacitive pads or other switches 124a-124n which correspond to numeric characters, alpha characters or any combination of alphanumeric characters. In an example, the keypad 122 may transmit commands via hardwired signals to the controller 104 which correspond to a sequence of numeric characters, alpha characters, or alpha-numeric characters in response to the user selecting various switches 124a-124n. In another example, the keypad 122 may transmit commands via RF signals which correspond to the alpha, numeric, or alpha-numeric characters to the controller 104 in response to the user selecting various switches 124a-124n. Responsive to receiving the commands, e.g., two or more signals (RF or hardwired) which correspond to a valid sequence of alpha, numeric, or alpha-numeric characters, the controller 104 may control the unlock/lock mechanism 118 to unlock/lock one or more vehicle 102 doors.

The controller 104 may further include an ignition switch authentication device 128. The ignition switch authentication device 128 may also include an RF receiver (not shown) and an antenna (not shown) for receiving RF signals transmitted by the RF transmitters of the keys. It should be noted that the ignition switch authentication device 128 may be implemented as a standalone controller (or module). The ignition switch authentication device 128 may be configured to authenticate the particular type of mechanism used to start the vehicle 102. For example, with the PATS implementation, the key may be inserted into an ignition switch 130 to start the vehicle 102. In such a case, the RF transmitter of the key transmits RF signals having encrypted data therein to the receiver of the ignition switch authentication device 128. The ignition switch authentication device 128 may accordingly decrypt the data to authenticate the key prior to allowing the user to start the vehicle 102.

With the PEPS implementation, as noted above, a key may not be required to start the vehicle 102. In such a case, the ignition switch authentication device 128 may authenticate the RF encrypted data passively transmitted by the transmitter to allow the user to start the engine of the vehicle 102. As noted above, in addition to the authentication device 128 authenticating the RF encrypted data, the user may perform a predetermined operation (e.g., pull handle of a door, or open door, toggle the brake pedal switch, or other operation) prior to depressing a start switch to start the vehicle 102. The system 100 contemplates a number of other operations from those listed prior to depressing the start switch to start the vehicle 102.

The controller 104 may be in communication with a wireless controller 132 configured to communicate with mobile devices 134. The mobile devices 134 may be any of various types of portable computing device, such as cellular phones, tablet computers, smart watches, laptop computers, portable music players, or other devices capable of communication with the wireless controller 132. In many examples, the wireless controller 132 may include a wireless transceiver 136 (e.g., a BLUETOOTH module, a ZIGBEE transceiver, a Wi-Fi transceiver, an IrDA transceiver, an RFID transceiver, etc.) having an antenna 138 and configured to communicate with a compatible wireless transceiver 140 and antenna 142 of the mobile device 134.

The communications network 144 may provide communications services, such as packet-switched network services (e.g., Internet access, VoIP communication services), to devices connected to the communications network 144. An example of a communications network 144 may include a cellular telephone network. Mobile devices 134 may provide network connectivity to the communications network 144 via a device modem 146 of the mobile device 134. To facilitate the communications over the communications network 144, mobile devices 134 may be associated with unique device identifiers (e.g., mobile device numbers (MDNs), Internet protocol (IP) addresses, etc.) to identify the communications of the mobile devices 134 over the communications network 144.

Occupants of the vehicle 102 or users outside the vehicle 102 may be identified by the wireless controller 132 according to paired device data 148 maintained in a storage medium of the wireless controller 132. The paired device data 148 may indicate, for example, the unique device identifiers of mobile devices 134 previously paired with the wireless controller 132 of the vehicle 102, such that the wireless controller 132 may automatically reconnected to the mobile devices 134 referenced in the paired device data 148 without user intervention.

When a mobile device 134 that supports network connectivity is paired with the wireless controller 132, the mobile device 134 may allow the wireless controller 132 to use the network connectivity of the device modem 146 to communicate over the communications network 144 with a remote server 174 or other remote computing devices. In one example, the wireless controller 132 may utilize a data-over-voice plan or data plan of the mobile device 134 to communicate information between the wireless controller 132 and the communications network 144. Additionally or alternately, the wireless controller 132 may utilize a vehicle modem (not shown) to communicate information between the wireless controller 132 and the communications network 144, without use of the communications facilities of the mobile device 134.

The mobile device 134 may include one or more processors 150 configured to execute instructions of mobile applications loaded to a memory 152 of the mobile device 134 from storage medium 154 of the mobile device 134. In some examples, the mobile applications may be configured to communicate with the wireless controller 132 via the wireless transceiver 136 and/or with the remote server 174 or other network services via the device modem 146.

The controller 104 and/or the wireless controller 132 may further be on communication with a media content controller 156. The media content controller 156 may be configured to send requests to capture devices 158 of the vehicle 102 to capture media content such as images, audio, and/or video, and to receive the requested media content from the capture devices 158 in response. The capture devices 158 may include any of various types of devices configured to capture media content. In an example, the capture devices 158 may include a 360 degree view camera or a set of cameras configured to provide a panoramic view of the vehicle 102 surroundings. Other types of capture devices 158 may include microphones to capture audio content, such as a microphone in the vehicle cabin used to receive voice commands from users or one or more other microphones external to the vehicle 102 cabin. In some cases, a capture device 158 may be configured to capture a single type of media content (e.g., video, audio, still images, etc.), while in other cases the capture device 158 may be able to capture multiple types of media content instance (e.g., both audio and video). The vehicle 102 may include one or more capture devices 158. The media content controller 156 may be further configured to include metadata information in the captured media content, and store and transfer the captured media content for use by the vehicle 102 systems.

The controller 104 may also include various types of computing apparatus to facilitate the performance of the functions of the controller 104. In an example, the controller 104 may include a processor 160 configured to execute computer instructions loaded to a memory 162 of the controller 104, and a storage medium 164 on which the computer-executable instructions may be maintained. A computer-readable storage medium 164 (also referred to as a processor-readable medium 164 or storage 164) includes any non-transitory (e.g., tangible) medium that participates in providing data (e.g., instructions) that may be read by a computer (e.g., by the processor 160). In general, a processor 160 receives instructions, e.g., from the storage 164, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Java Script, Perl, PL/SQL, etc.

The mode settings 166 may be stored to the storage medium 164 of the controller 104, and may be used by the controller 104 to control the locking and unlocking functionality of the vehicle 102. In an example, the controller 104 may include delivery mode settings 166-A configured to control locking, unlocking, and media capture behavior of the vehicle 102 when vehicle actions 168 are indicative of delivery of persons, packages or other items, and normal mode settings 166-B configured to control locking, unlocking, and media capture behavior of the vehicle 102 when the sequence of operations being performed by the driver is not indicative of delivery.

The vehicle actions 168 may include a machine-readable representation of one or more operations performed by or to the vehicle 102, optionally specified in a predetermined order, that when identified by the controller 104 cause the controller 104 to select an associated set of mode settings 166 to be used by the controller 104. In an example, the vehicle actions 168 may include one or more operations indicative of the driver initiating delivery of packages (e.g., messages indicative of an operator stopping the vehicle 102, opening a driver door, closing the driver door, opening a cargo door, closing the cargo door, etc.). In another example, the vehicle actions 168 may include one or more operations indicative of the driver discontinuing delivery of packages (e.g., vehicle 102 detection of the operator completing or discontinuing travel along a delivery route programmed to a navigation unit of the vehicle 102). In yet further examples, the vehicle actions 168 may be indicative of other modes for which mode settings 166 should be adjusted for use by the controller 104. As a non-delivery example, the vehicle actions 168 may be indicative of the driver stopping at a school to pick up children at a predetermined pickup time.

The mode control application 170 may be an application installed to the storage medium 164 of the body controller 104. (In other examples, the mode control application 170 application or functionality may be implemented in whole or in part by other modules of the vehicle 102, such as by a separate mode control module, by the engine control module, as an application installed to a telematics control unit, etc.) When executed by the processor 160, the mode control application 170 may be configured to cause the controller 104 to monitor vehicle bus activity and/or other inputs to the vehicle 102 to detect the vehicle actions 168. When detected, the mode control application 170 may be configured to apply mode settings 166 to the controller 104 that are associated with the identified vehicle actions 168. For instance, the mode control application 170 may identify that the vehicle 102 has stopped for delivery and may transition the controller 104 to utilize the delivery mode settings 166-A. Or, the mode control application 170 may identify that the vehicle 102 has completed a delivery route and may transition the controller 104 to utilize the normal mode settings 166-B.

The notification application 172 may be an example of a mobile application installed to the mobile device 134 and configured to interact with the vehicle 102 via the wireless controller 132. The notification application 172 may be configured to facilitate configuration of the settings of the controller 104, aid in the identification by the mode control application 170 of the location of the operator, and receive alerts generated by the vehicle 102 regarding unexpected events occurring at the vehicle 102.

Figure 2:
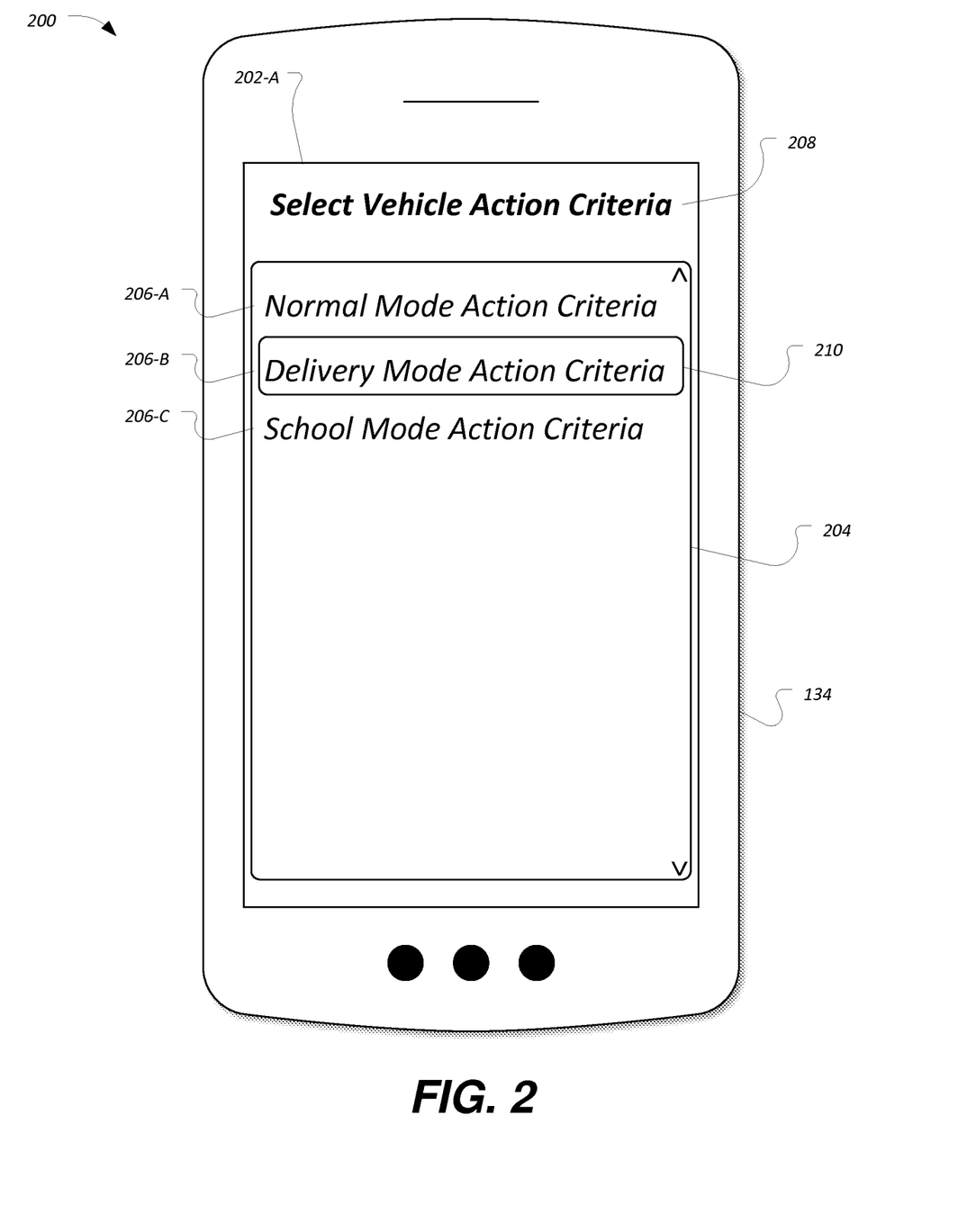
FIG. 2 illustrates a diagram of an example user interface for selecting a set of vehicle action criteria for configuration.

FIG. 2 illustrates a diagram 200 of an example user interface 202-A for selecting a set of vehicle action 168 criteria for configuration. As illustrated, the user interface 202-A may be presented to the user by the notification application 172 via a display of the mobile device 134. As another possibility, the user interface 202-A may be provided to the user via a display of the vehicle 102 (not shown). The user interface 202-A may be displayed upon various conditions, such as when the mobile device 134 is connected to the vehicle 102 for the first time, when the mobile device 134 is connected to the vehicle 102 and the vehicle 102 has not yet set up vehicle actions 168, or upon user selection of a function to update the vehicle actions 168 configured for transitioning the mode settings 166 of the controller 104 of the vehicle 102.

The user interface 202-A may include a list control 204 configured to display a listing of the sets of vehicle action 168 criteria that may be configured by the user. As shown, each of the sets of vehicle action 168 is displayed as one of several selectable list entries 206. The user interface 202-A may also include a title label 208 to indicate to the user that the user interface 202-A is for selection of vehicle action 168 criteria.

As illustrated, the list control 204 of the notification application 172 includes an entry 206-A for normal mode vehicle actions 168, an entry 206-B for delivery mode vehicle actions 168, and an entry 206-C for school mode vehicle actions 168. It should be noted that the exact commands, number of commands, and command order is merely an example. The list control 204 may operate as a menu, such that a user of the user interface 202-A may be able to scroll through list entries of the list control 204 to adjust a currently selected list entry 210 (e.g., using up and down arrow buttons) as well as to invoke the currently selected list entry 210 (e.g., using a select button). In some cases, the list control 204 may be displayed on a touch screen display, such that the user may be able to touch the list control 204 to select and invoke a menu item. As another example, the user interface 206-A may support voice command selection of the menu items. For example, to invoke configuration of the delivery mode vehicle actions 168, the user may press a push-to-talk button or say a voice command initiation keyword, and may speak the voice command "delivery mode action criteria."

Figure 3:
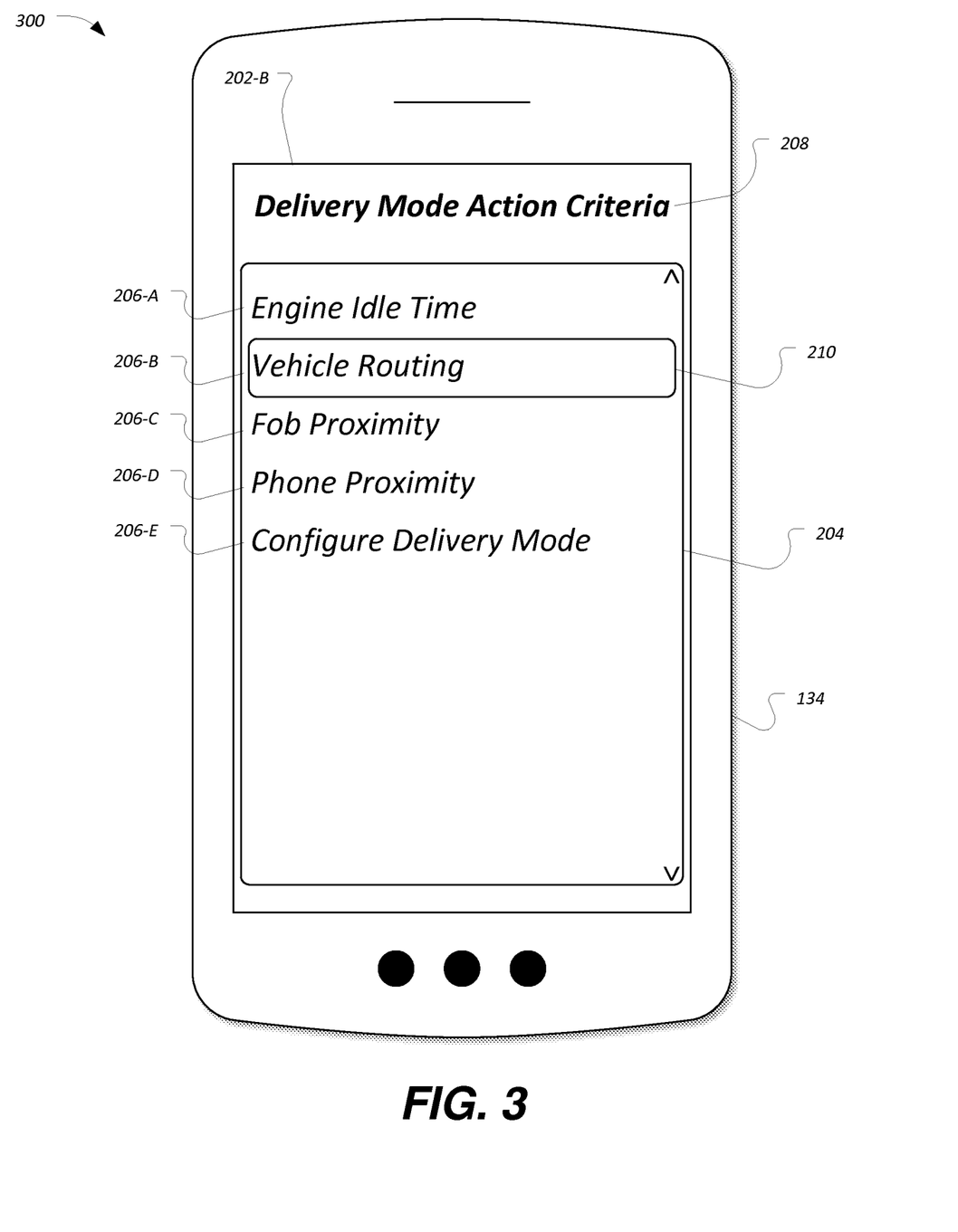
FIG. 3 illustrates a diagram of an example user interface for adjustment of criteria for a selected set of vehicle actions.

FIG. 3 illustrates a diagram 300 of an example user interface 202-B for adjustment of criteria for a selected set of vehicle actions 168. As with the user interface 202-A, the user interface 202-B may be presented to the user via display features of mobile device 134 (or vehicle 102). The user interface 202-B may be displayed, for example, based upon a user selection of the delivery mode vehicle actions 168 entry 206-B of the user interface 202-A. The user interface 202-B may also include a title label 208 to indicate to the user that the user interface 202-B is for adjustment of the selected set of vehicle action 168 criteria.

As illustrated, the list control 204 of the notification application 172 includes entries for the configuration of specific aspects of the vehicle actions 168, that when detected, cause the mode control application 170 to transition the controller 104 to use of mode settings 166 corresponding to the vehicle actions 168. These options may include, for example, an entry 206-A for configuring engine idle time, an entry 206-B for configuring vehicle routing, an entry 206-C for configuring key fob 108 proximity detection, an entry 206-D for configuring mobile device 134 proximity detection, and an entry 206-E for configuring the delivery mode settings 166-B.

Figure 4:
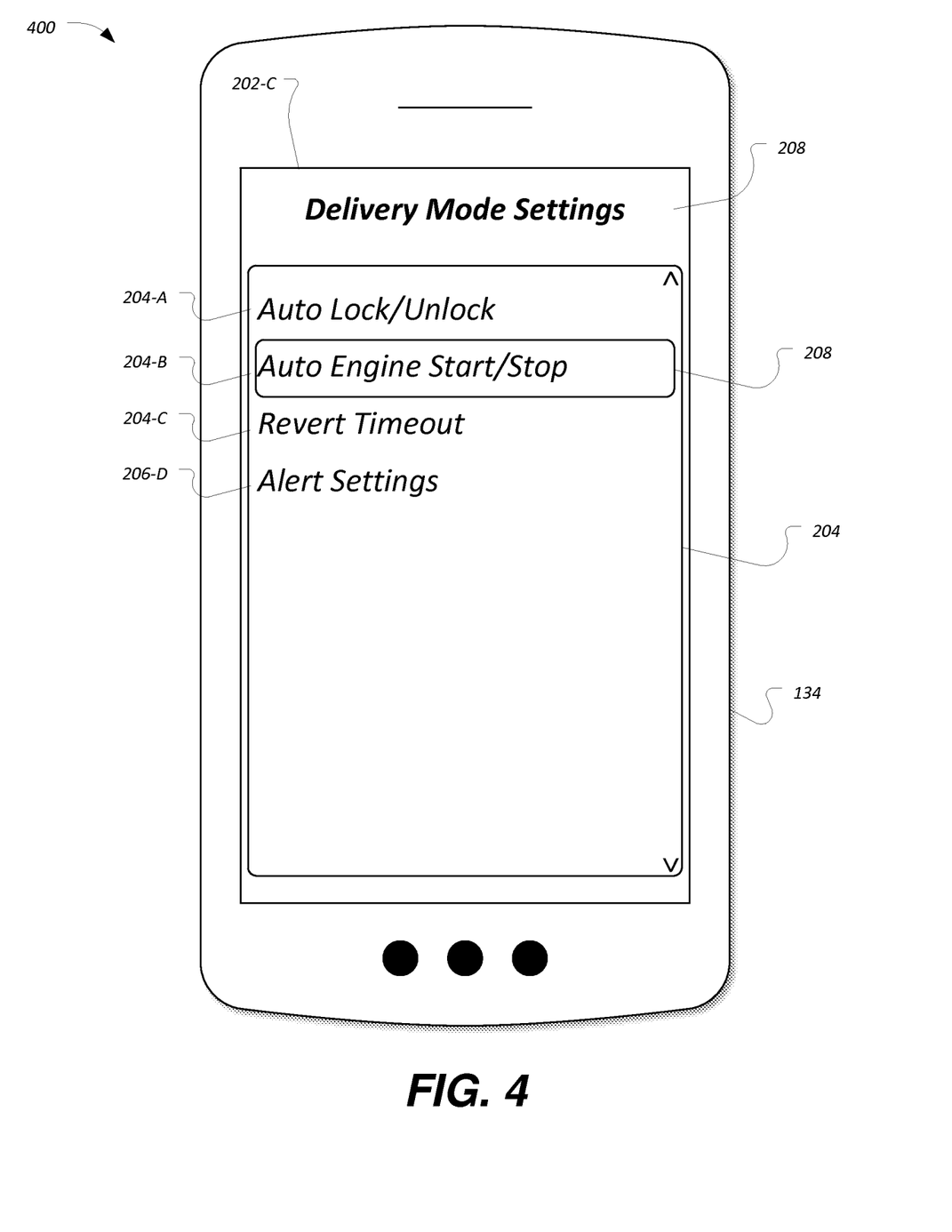
FIG. 4 illustrates a diagram of an example user interface for configuring vehicle operation for a set of vehicle mode settings.

FIG. 4 illustrates a diagram 400 of an example user interface 202-C for configuring vehicle 102 operation for a set of vehicle mode settings 166. As with the user interfaces 202-A and 202-B, the user interface 202-C may be presented to the user via display features of mobile device 134 (or vehicle 102). The user interface 202-C may be displayed, for example, based upon a user selection from the user interface 202-B of the entry 206-E for configuring the delivery mode settings 166-B. The user interface 202-C may also include a title label 208 to indicate to the user that the user interface 202-C is for adjustment of the selected set of vehicle action 168 criteria.

As illustrated, the list control 204 of the notification application 172 includes entries for the configuration of specific aspects of the mode settings 166 that may be applied to the controller 104. These options may include, for example, an entry 206-A for configuring automatic locking and unlocking behavior of the vehicle 102, an entry 206-B for configuring automatic engine start/stop behavior for the vehicle 102, an entry 206-C for configuring a timeout after which the vehicle 102 may determine that the mode is abandoned and may return to a normal mode, and an entry 206-D for configuring alert settings in case of detection of unauthorized persons when the vehicle 102 is in the mode and the driver is away from the vehicle 102.

Using the user interfaces 202, a user may accordingly be able to manage criteria used to transition the vehicle 102 into and out of the different modes (e.g., normal mode, delivery mode, school mode, etc.), as well as the specific functioning of the controller 104 while in the various modes.

For example, when in the delivery mode, the controller 104 may be configured to automatically unlock vehicle 102 doors when the operator of the vehicle 102 approaches and automatically lock the vehicle 102 doors when the operator of the vehicle 102. Or, when in the normal mode, the controller 104 may be configured to unlock the doors responsive to operator feedback, such as use of the key fob 108 or keypad 122 to request door unlock. Or, when in the school mode, the controller 104 may be configured to automatically adjust climate control settings when parked.

Figure 5:
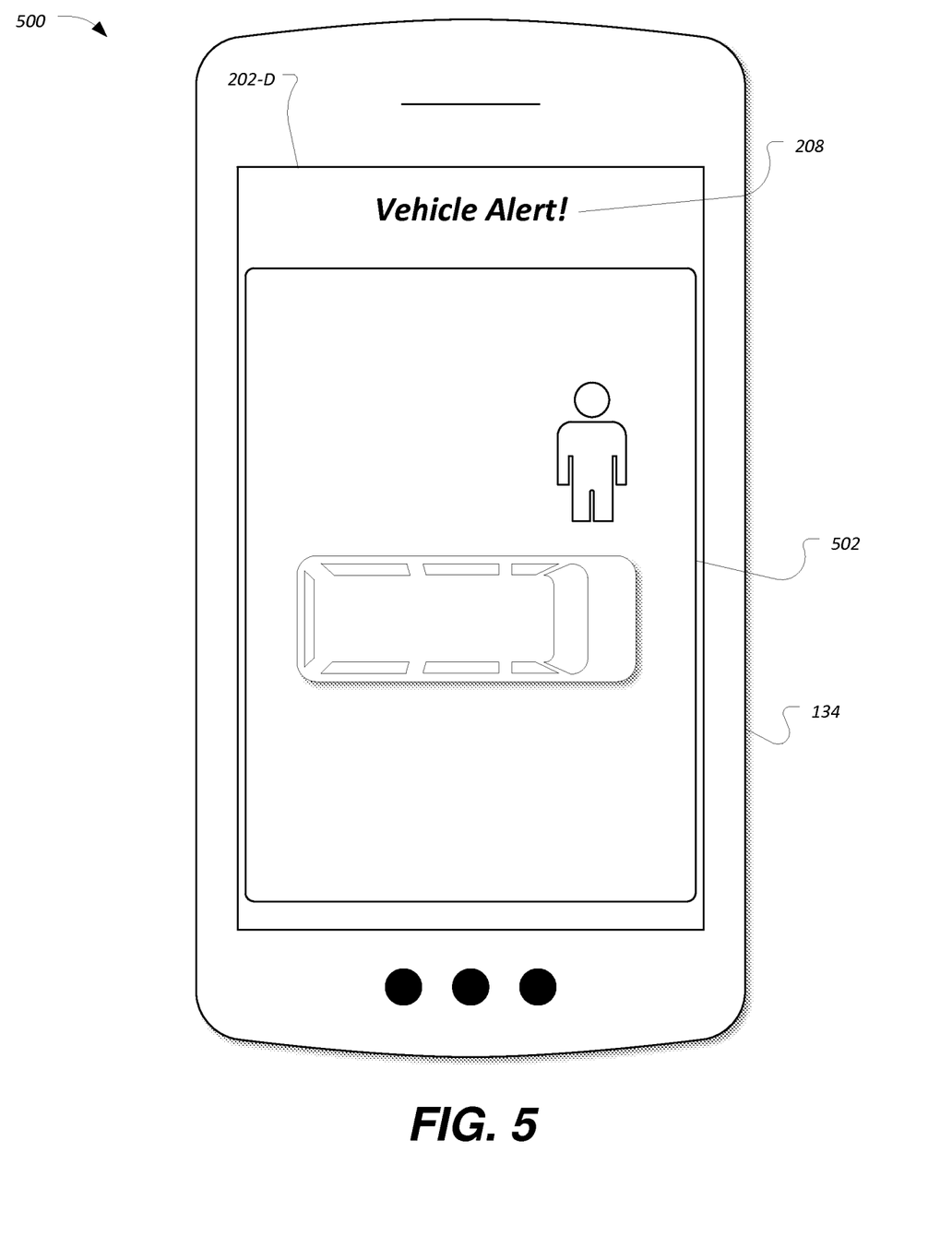
FIG. 5 illustrates a diagram of an example user interface for alerting the user of an unauthorized user in proximity to the vehicle.

FIG. 5 illustrates a diagram 500 of an example user interface 202-D for alerting the user of an unauthorized user in proximity to the vehicle 102. As with the user interfaces 202-A, 202-B, and 202-C, the user interface 202-D may be presented to the user via display features of mobile device 134. The user interface 202-D may be displayed, for example, responsive to the controller 104 determining that an unauthorized person is in proximity of the vehicle 102. The user interface 202-D may also include a title label 208 to indicate to the user that the user interface 202-D is for the display of an alert.

The user interface 202-D may also include a display control 502 configured to display media content captured by the capture device 158 of the vehicle 102. In an example, the vehicle 102 may utilize the wireless transceiver 136 to transmit the captured media content to the mobile device 134, which may be received by the wireless transceiver 140, provided to the notification application 172, and trigger the display of the user interface 202-D. In another example, the captured media content may be provided by the wireless transceiver 136 (or an in-vehicle modem) to the remote server 174 via the communications network 144, and may be retrieved from the remote server 174 by the mobile device 134 via the communications network 144.

Regardless of how the captured media content is received, the user interface 202-D may be configured to provide an indication to the user of the condition causing the alert. In an example, the capture devices 158 may include a 360 degree view camera or a set of cameras configured to provide a panoramic view of the vehicle 102 surroundings, and the display control 502 may display the panoramic view to the user of the mobile device 134.

Figure 6:
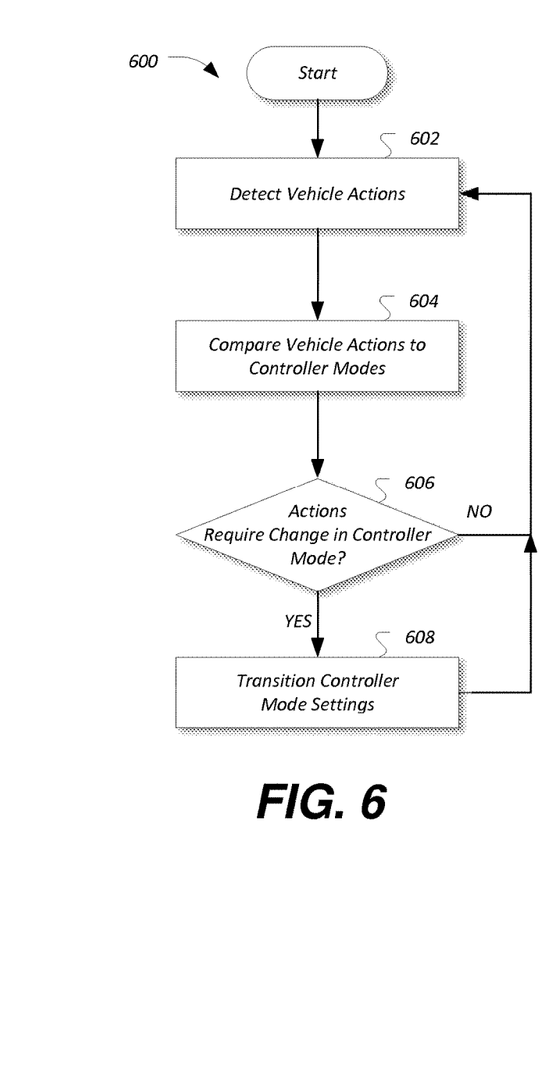
FIG. 6 illustrates an example process for adjusting mode settings of the controller based on detection of vehicle actions.

FIG. 6 illustrates an example process 600 for adjusting mode settings 166 of the controller 104 based on detection of vehicle actions 168. The process 600 may be performed, in an example, by the controller 104 in communication with other systems of the vehicle 102.

At operation 602, the controller 104 detects vehicle actions 168. In an example, the mode control application 170 may determine the presence or lack of presence of the driver according to detection or lack of detection of the driver's mobile phone 134 or key fob 108. In another example, the mode control application 170 may determine for how long the vehicle 102 remains in a location based on global positioning data, lack of movement recorded by wheel sensors, presence of the vehicle 102 within a predefined geo-fence area at a predetermined time, etc.

At operation 604, the controller 104 compares the detected vehicle actions 168 to maintained mode settings 166. In an example, the mode control application 170 may identify whether the vehicle actions 168 match vehicle actions 168 associated with mode settings 166 of the controller 104. For instance, the mode control application 170 may compare the vehicle actions 168 to vehicle actions 168 associated with normal mode, to vehicle actions 168 associated with delivery mode, and to vehicle actions 168 associated with school mode.

At operation 606, the controller 104 determines whether the actions require a change in mode settings 166 of the controller 104. In an example, the mode control application 170 may determine that the vehicle actions 168 match vehicle actions 168 associated with one of the mode settings 166 of the controller 104. If so, control passes to operation 608. Otherwise, control passes to operation 602.

At operation 608, the controller 104 transitions to the mode settings 166 matching the identifier vehicle actions 168. In an example, the controller 104 may transition to operation using the normal mode settings 166-B, the delivery mode settings 166-A, other settings such as school mode settings 166, etc. After operation 608, control passes to operation 602.

Figure 7:
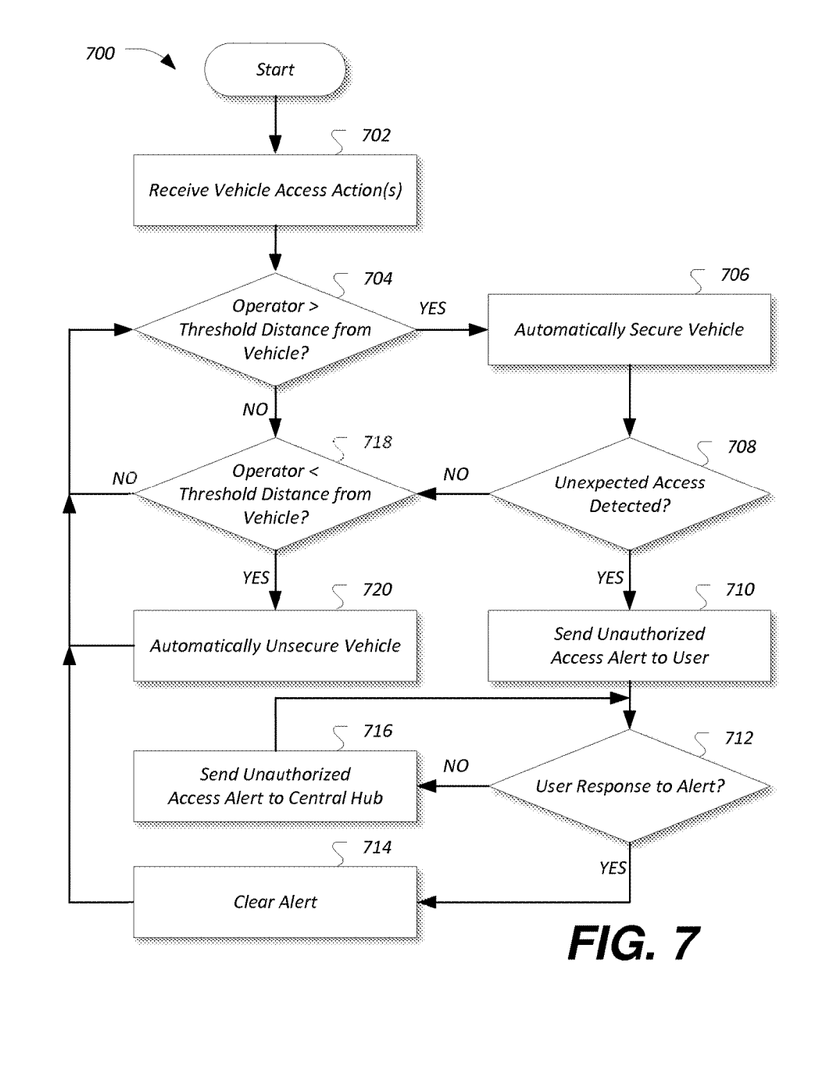
FIG. 7 illustrates an example process for controlling a vehicle using delivery mode settings.

FIG. 7 illustrates an example process 700 for controlling a vehicle using delivery mode settings 166-A. As with the process 600, the process 700 may be performed, in an example, by the controller 104 in communication with other systems of the vehicle 102.

At operation 702, the controller 104 receives an indication of a vehicle action 168 relating to access to the vehicle 102. As some examples, the mode control application 170 may receive the vehicle actions 168 from sources such as lock/unlock mechanism 118, the keypad 122, the ignition switch 130, the RF transceiver 106, the wireless controller 132, or one or more other vehicle modules in communication with the controller 104 over a vehicle network such as a vehicle CAN bus. The vehicle actions 168 may include one or more of parking the vehicle 102/unlocking the vehicle 102, opening the driver door of the vehicle 102, closing the driver door of the vehicle 102, opening the cargo door of the vehicle 102, closing the cargo door of the vehicle 102.

At operation 704, the controller 104 determines whether the driver or other vehicle 102 operator is at least a predetermined threshold distance away from the vehicle 102. In an example, the mode control application 170 may determine the distance of the vehicle 102 from the key fob 108 according to signal strength received by the RF transceiver 106 from the key fob 108. In another example, the controller 104 may determine the distance of the operator to the vehicle 102 using the mobile device 134 (e.g., according to a global position determined by the mobile device 134 and provided to the vehicle 102). As some non-limiting examples, the predetermined threshold distance may be one meter, two meters, or ten meters. In another example, the predetermined threshold distance may be configurable, e.g., via the user interface 202 of the notification application 172. If the operator is at least the predetermined threshold distance away, control passes to operation 706. Otherwise, control passes to operation 712.

At operation 706, the controller 104 automatically secures the vehicle 102. In an example, the mode control application 170 may lock the doors of the vehicle 102, may shut off the engine of the vehicle 102 (e.g., if the vehicle 102 is not equipped with start/stop technology), and may enable the media capture functionality of the capture device 158 (e.g., via bus command from the controller 104 to the media content controller 156).

At operation 708, the controller 104 determines whether unexpected access to the vehicle 102 is detected. In an example, the mode control application 170 may receive an indication of attempted vehicle access (e.g., a pull of a door handle) while operator is at least a predetermined threshold distance away from the vehicle 102. If an unexpected access is detected, control passes to operation 710. Otherwise, control passes to operation 718.

At operation 710, the controller 104 sends an alert to the user. In an example, the mode control application 170 may utilize the wireless transceiver 136 to transmit the captured media content to the mobile device 134. In another example, the captured media content may be provided by the wireless transceiver 136 (or an in-vehicle modem) to the remote server 174 via the communications network 144, and may be retrieved from the remote server 174 by the mobile device 134. An example user interface 202-D for alerting the operator of an unauthorized user in proximity to the vehicle 102 is described above with respect to FIG. 5.

At operation 712, the controller 104 determines whether the driver or other vehicle 102 operator has responded to the alert. In an example, the user may verify the cause of the alert, and may clear the alert using the user interface 202-D. If the user selects to clear the alert within a predefined period of time (e.g., five seconds, thirty seconds, two minutes, an amount of time preconfigured by the user of the mobile device 134, an amount of time preconfigured etc.), control passes to operation 714. Otherwise, control passes to operation 716.

At operation 714, the controller 104 clears the alert. With the alert condition cleared, control passes to operation 704.

At operation 716, the controller 104 sends an alert to a central hub. In an example, the mode control application 170 may utilize the wireless transceiver 136 to transmit the captured media content to the remote server 174 for access by a central hub user. The central hub user may accordingly receive the media content and determine whether to call for assistance for the vehicle 102. In an example, the central hub user may call police or another authority to inform them of the situation with the vehicle 102. When doing so, the central hub user may be able to provide evidence in the form of the media content collected by the vehicle 102 with respect to the alert.

At operation 718, the controller 104 determines whether the driver or other vehicle 102 operator is at least a predetermined threshold distance away from the vehicle 102. The distance determination may be performed as discussed above with respect to operation 704. If the operator is not at least the predetermined threshold distance away, control passes to operation 720. Otherwise, control passes to operation 704.

At operation 720, the controller 104 automatically unsecures the vehicle 102. In an example, the mode control application 170 may unlock the doors of the vehicle 102, may restart the engine of the vehicle 102 (e.g., if the vehicle 102 is not equipped with start/stop technology), and may disable the media capture functionality of the capture device 158 (e.g., via bus command from the controller 104 to the media content controller 156). After operation 720, control passes to operation 704.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a controller of a vehicle, storing first mode settings defining lock operation of the controller in a first mode based on detected vehicle bus activity, and second mode settings defining different lock operation of the controller in a second mode based on the detected vehicle bus activity, configured to
        switch to the first mode settings from the second mode settings responsive to activity received by the controller over a vehicle bus indicative of the vehicle being operated in the second mode, the second mode being one of a delivery mode or a school mode, the activity received by the controller including one or more of: occurrence of a predefined amount of engine idle time, occurrence of predefined vehicle routing, key fob proximity detection, mobile device proximity detection, stopping in proximity to a school at a predetermined time, or a combination of two or more of stopping the vehicle, opening a driver door of the vehicle, closing the driver door, opening a cargo door of the vehicle, and closing the cargo door;
        while switched to the first mode settings, unlock at least one door of the vehicle responsive to the controller detecting proximity of a vehicle operator, and lock the at least one door responsive to the controller detecting a lack of proximity of the vehicle operator for a predetermined period of time; and
        while switched to the second mode settings, lock or unlock the at least one door responsive to manual operator input.

2. The system of claim 1, wherein the controller is configured to monitor the vehicle bus activity over the vehicle bus to receive the activity, the activity including vehicle actions, and the first mode settings are associated with a set of received vehicle actions that, when identified by the controller, cause the controller to switch to the first mode settings.

3. The system of claim 1, wherein the controller is further configured to maintain the first mode settings and the second mode settings on a non-volatile storage of the controller.

4. A system comprising:
    a mobile device configured to
        set vehicle actions to a controller of a vehicle that, if are detected to occur by the controller, cause the controller to transition from first mode settings describing a first locking behavior of a first mode of operation of the controller to second mode settings of the controller describing a second different locking behavior of a second mode of operation of the controller, wherein the first locking behavior is configured to cause the vehicle to send alerts to the mobile device responsive to detection of an unauthorized user, and the second locking behavior is configured to cause the vehicle to ignore the unauthorized user, the second mode being one of a delivery mode or a school mode, the vehicle actions being indicative of: occurrence of a predefined amount of engine idle time, occurrence of predefined vehicle routing, key fob proximity detection, mobile device proximity detection, stopping in proximity to a school at a predetermined time, or a combination of two or more of stopping the vehicle, opening a driver door of the vehicle, closing the driver door, opening a cargo door of the vehicle, and closing the cargo door; and
        display an alert user interface responsive to receipt of one of the alerts from the controller, the one of the alerts being received responsive to the controller detecting presence of an unauthorized user within vicinity of the vehicle.

5. The system of claim 1, wherein the first mode settings are configured to cause the controller to deactivate a media capture device of the vehicle responsive to the controller detecting proximity of a vehicle operator, and to activate the media capture device responsive to the controller detecting a lack of proximity of the vehicle operator for a predetermined period of time.

6. The system of claim 5, wherein the first mode settings are further configured to, responsive to detection, by the controller, of access to the vehicle during the lack of proximity of the vehicle operator, send an alert message to a mobile device of the vehicle operator including media captured by the media capture device.

7. The system of claim 1, wherein the controller is a body controller of the vehicle.

8. A computer-implemented method comprising:
    detecting vehicle actions including operator proximity and vehicle door lock status;
    comparing the vehicle actions, as detected, to first vehicle actions specifying criteria for transition to first mode settings defining a first mode of operation of a vehicle body controller and to second vehicle actions specifying criteria for transition to second mode settings defining a second mode of operation of the vehicle body controller, the first mode settings specifying criteria for locking and unlocking the vehicle, the second mode settings specifying different criteria for locking and unlocking the vehicle, the second mode being one of a delivery mode or a school mode, the first vehicle actions being indicative of: occurrence of a predefined amount of engine idle time, occurrence of predefined vehicle routing, key fob proximity detection, mobile device proximity detection, stopping in proximity to a school at a predetermined time, or a combination of two or more of stopping the vehicle, opening a driver door of the vehicle, closing the driver door, opening a cargo door of the vehicle, and closing the cargo door;
    transitioning the mode settings of the vehicle body controller to the first mode settings responsive to the vehicle actions matching the first vehicle actions;

when using the first mode settings, unlocking at least one door of the vehicle responsive to detected operator proximity, and locking the at least one door responsive to detected lack of operator proximity; and when using the second mode settings, locking or unlocking the vehicle doors responsive to manual operator input.

9. The method of claim 8, further comprising:

detecting the second vehicle actions including operator proximity and vehicle door lock status; and transitioning the mode settings of the vehicle body controller to the second mode settings responsive to the second vehicle actions matching the second vehicle actions.

10. The method of claim 8, wherein the vehicle actions further include at least one of engine idle time and vehicle routing information.

11. The method of claim 8, further comprising determining the operator proximity according to at least one of signal strength of a key fob associated with the operator to the vehicle and location of a mobile device associated with the operator to the vehicle.

12. The method of claim 8, further comprising maintaining the first mode settings and the second mode settings on a non-volatile storage of the controller.

13. The system of claim 4, wherein the mobile device is further configured to receive the alert from a remote server, and the remote server is configured to receive the alert from the vehicle.

14. The method of claim 8, wherein the first mode settings include deactivating a media capture device of the vehicle responsive to detected operator proximity, and activating the media capture device responsive to detected lack of operator proximity.

15. The system of claim 4, wherein the alert includes media content captured by the vehicle.

16. The system of claim 4, wherein the mobile device is further configured to send a message to clear the alert responsive to user input to the alert user interface.

17. The system of claim 4, wherein the mobile device is further configured to receive the alert from the vehicle over a wireless connection between the mobile device and the vehicle.

* * * * *